United States Patent
Khafizov et al.

(10) Patent No.: US 10,254,889 B1
(45) Date of Patent: *Apr. 9, 2019

(54) METHOD AND APPARATUS FOR DETERMINING A VALID SEQUENCE OF TOUCH EVENTS ON A TOUCH SENSITIVE DEVICE

(71) Applicant: OPEN INVENTION NETWORK LLC, Durham, NC (US)

(72) Inventors: Farid Khafizov, Plano, TX (US); Margarita Khafizova, Plano, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,630

(22) Filed: Sep. 11, 2018

Related U.S. Application Data

(63) Continuation of application No. 15/810,084, filed on Nov. 12, 2017, now Pat. No. 10,073,566, which is a continuation of application No. 15/364,570, filed on Nov. 30, 2016, now Pat. No. 9,817,519, which is a continuation of application No. 14/333,233, filed on Jul. 16, 2014, now Pat. No. 9,524,042, which is a continuation of application No. 12/957,966, filed on Dec. 1, 2010, now Pat. No. 8,786,560.

(60) Provisional application No. 61/317,812, filed on Mar. 26, 2010.

(51) Int. Cl.
G06F 3/041 (2006.01)
G06F 3/043 (2006.01)

(52) U.S. Cl.
CPC ............ *G06F 3/0416* (2013.01); *G06F 3/041* (2013.01); *G06F 3/0418* (2013.01); *G06F 3/0433* (2013.01); *G06F 2203/04104* (2013.01); *G06F 2203/04105* (2013.01)

(58) Field of Classification Search
CPC .................................................... G06F 3/0418
See application file for complete search history.

(56) References Cited

U.S. PATENT DOCUMENTS

| | | | |
|---|---|---|---|
| 6,801,191 B2* | 10/2004 | Mukai | G06F 3/04883 178/18.01 |
| 2005/0052432 A1* | 3/2005 | Kraus | G06F 3/0421 345/173 |
| 2011/0154390 A1* | 6/2011 | Smith | H04N 21/482 725/32 |

* cited by examiner

*Primary Examiner* — Lisa S Landis

(57) ABSTRACT

Certain aspects of the present disclosure relate to a technique for determining a valid sequence of touch events on a touch sensitive device. A first sequence of touch events is received, a proximity between any two touch events of the first sequence of touch events being greater than a proximity threshold. A second sequence of touch events is received. The touch events from the first and the second sequence are combined if a time difference between the first and the second sequence of touch events is below a time threshold and a proximity between the first and the second sequence of touch events is less than the proximity threshold. A valid sequence of touch events is determined if a combined pressure of the first and the second sequence of touch events is greater than a pressure threshold.

20 Claims, 9 Drawing Sheets

METHOD AND APPARATUS FOR DETERMINING A VALID SEQUENCE OF TOUCH EVENTS ON A TOUCH SENSITIVE DEVICE

FIELD OF THE INVENTION

The present disclosure relates generally to touch sensitive devices and, more specifically, to a method, apparatus and computer-readable medium for determining a valid touch event on a touch sensitive device.

BACKGROUND OF THE INVENTION

The present invention relates generally to a system, method and computer readable medium of detecting and correctly interpreting repeated touches of one or more users of a touch sensitive screen.

Touch input systems have become ubiquitous throughout industrialized countries. These systems have replaced or supplemented conventional input systems, such as keyboard or mouse in many applications, including for example, information kiosks, retail point of sale, order input (e.g., restaurants), and industrial line operations. Various sensing technologies are applied in touch input systems currently in marketplace, including acoustic, resistive, capacitive and infrared. A touch input system is typically used in conjunction with some type of information display system that may include a computer. When a user touches a displayed object, the touch input system communicates the location of the touch to the system.

Usually one, two or more sensors are used to simultaneously detect signals originated from a touch event. Analysis of such signals allows identifying location and the relative strength of the contact. For example, U.S. Pat. No. 6,922,642 "Contact sensitive device" by D. M. Sullivan describes a contact sensitive device which uses bending wave vibration for extracting information relating to the contact from simultaneous measurements of two or more sensors.

Correctly detecting the false or true touch and location of the touch is very important. Unfortunately this may not be always achieved with desired level of reliability. Various approaches are available in prior art. For example, U.S. Pat. No. 6,492,279 "Dual sensor touch screen utilizing projective-capacitive and force touch sensors" by Joel Kent et al, describes a method and apparatus for discriminating against false touches in a touch screen system, where the system is designed to confirm a touch registered by one touch sensor with another touch sensor, preferably of a different sensor type, prior to acting upon the touch. Another approach is described in U.S. Pat. No. 5,543,589 "Touchpad with dual sensor that simplifies scanning" by William A. Buchana et al. This patent discloses a dual sensor touch screen in which each sensor determines touch and its position, but with a different resolution. While such systems increases touch detection reliability they also increase the cost of the system.

Alternative approaches in prior art systems rely on a single sensor detection where touch pressure is measured and decision is made on whether to act upon a touch or not depending on the measured value. For example, U.S. Pat. No. 5,510,813 "Data processing device comprising a touch screen and a force sensor" by Kofi A. A. Makinwa et al describes a system where the force of the touch is determined. In response to a touch, the system processes the detected force of the touch according to the needs of the application. Some applications available in the market place today rely on such single touch force measurement, and if the touch force/pressure is below certain value, the touch event is discarded. This often leads to unsatisfactory customer experience. Therefore a method and apparatus are needed to improve touch detection while keeping the cost low.

SUMMARY OF THE INVENTION

Certain aspects of the present disclosure provide a method for determining a valid sequence of touch events on a touch sensitive device. The method generally includes receiving a first sequence of touch events, a proximity between any two touch events of the first sequence of touch events being greater than a proximity threshold, receiving a second sequence of touch events, combining the touch events from the first and the second sequence if a time difference between the first and the second sequence of touch events is below a time threshold and a proximity between the first and the second sequence of touch events is less than the proximity threshold, and determining a valid sequence of touch events if a combined pressure of the first and the second sequence of touch events is greater than a pressure threshold.

Certain aspects of the present disclosure provide an apparatus for determining a valid sequence of touch events on a touch sensitive device. The apparatus generally includes at least one processor configured to receive a first sequence of touch events, a proximity between any two touch events of the first sequence of touch events being greater than a proximity threshold, receive a second sequence of touch events, combine the touch events from the first and the second sequence if a time difference between the first and the second sequence of touch events is below a time threshold and a proximity between the first and the second sequence of touch events is less than the proximity threshold and determine a valid sequence of touch events if a combined pressure of the first and the second sequence of touch events is greater than a pressure threshold; and a memory coupled to the at least one processor.

Certain aspects of the present disclosure provide a computer-program product for determining a valid sequence of touch events on a touch sensitive device, the computer-program product generally including a computer-readable medium comprising instructions for receiving a first sequence of touch events, a proximity between any two touch events of the first sequence of touch events being greater than a proximity threshold, receiving a second sequence of touch events, combining the touch events from the first and the second sequence if a time difference between the first and the second sequence of touch events is below a time threshold and a proximity between the first and the second sequence of touch events is less than the proximity threshold, and determining a valid sequence of touch events if a combined pressure of the first and the second sequence of touch events is greater than a pressure threshold.

Figure 1:
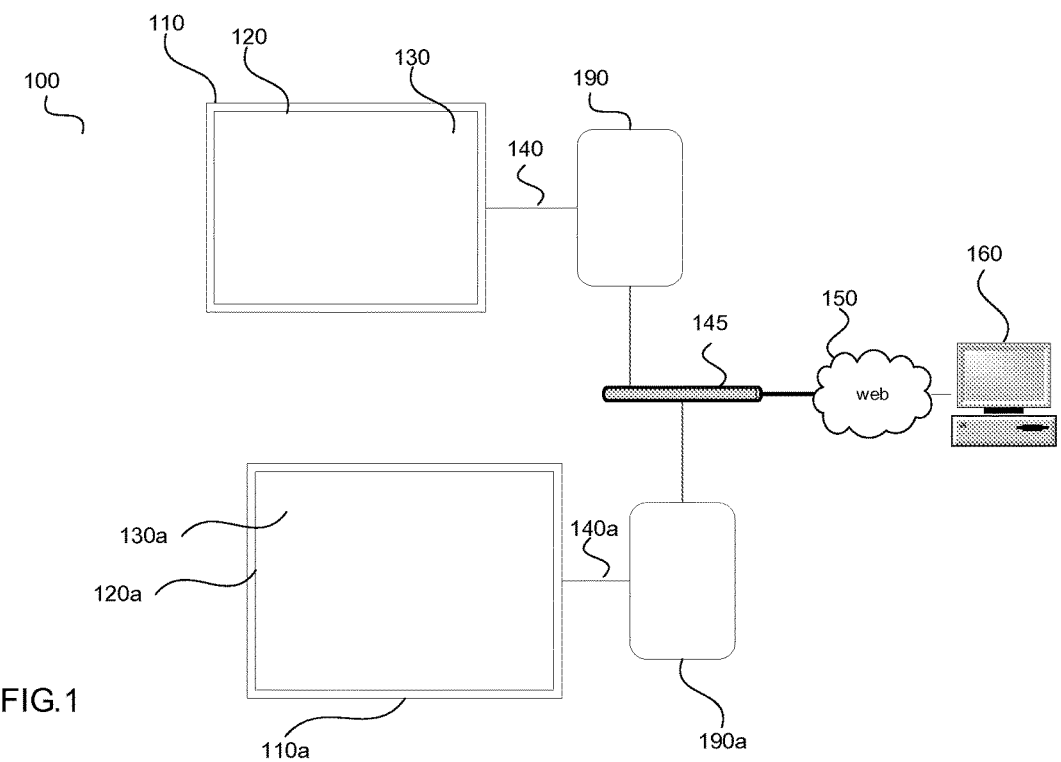
FIG. 1 is a block diagram conceptually illustrating an example of a conventional touch sensor system.

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION

FIG. 1 is a block diagram conceptually illustrating an example of a conventional touch sensor system 100. A touch sensor system generally includes one or more touch-screen devices. For example, the touch sensor system 100 includes two (identical in this example) touch-screen devices 110/110a communicatively coupled to their respective controllers 190/190a through the corresponding links 140/140a. In this example, controllers 190 and 190a as well as links 140 and 140a are assumed to be identical, but this is not necessary. Link 140 (and 140a) represents one or more physical links such as wire-line (e.g., Ethernet cable, twisted pair, etc.), wireless (WiFi, 3G, 4G, Bluetooth, etc.), or any other type of connection that may carry one or more communication channels. As will be illustrated later (see FIG. 2), in one aspect, link 140 may correspond to one or more communication channels carrying two outgoing and two incoming signals. The touch-screen device 110, communicatively coupled to a controller 190 through link 140, may include a transparent touch sensor layer 130 covered by a touch-screen 120 made out of transparent material such as glass. In certain aspects, a touch-screen device 110 and controller 190 may be enclosed into a single device. User interface unit 160 may be coupled with the controller 190 via direct link, internet web 150, wireless, or another connection. In certain aspects, a touch sensor system may only have one touch-screen device. In certain aspects, controller 190 and controller interface unit 160 may be built in to the touch-screen device 110. Separate units 110, 110a, 190, 190a, and 160 are shown purely for illustrative purposes.

There are a number of touch screen technologies including resistive, surface acoustic wave, capacitive, projected capacitance, infrared, strain gauge, optical imaging, dispersive signal technology, and acoustic pulse recognition. Each technology has its own advantages and disadvantages. For example, in resistive technology, the touch screen panel is composed of several layers, the most important of which are two thin, metallic, electrically conductive layers separated by a narrow gap.

Figure 2:
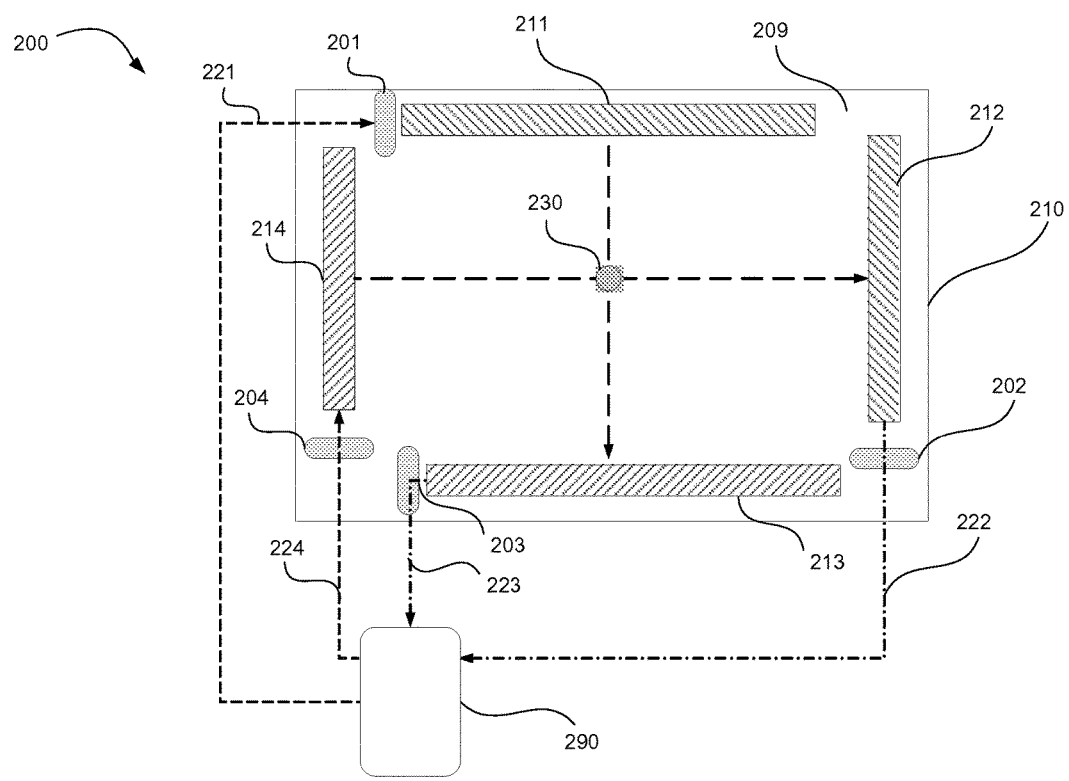
FIG. 2 is a block diagram conceptually illustrating an example of a conventional acoustic wave touch input system.

Figure FIG. 2 illustrates a touch input system and touch detection operation using as an example an acoustic wave touch input system. Acoustic wave technology uses ultrasonic waves that pass over the touch screen panel. When the panel is touched, a portion of the wave is absorbed. This change in the ultrasonic waves registers the position of the touch event and sends this information to the controller for processing. It should be noted that choice of acoustic wave technology does not limit present invention to acoustic wave technology only; it is used for illustrative purposes only FIG. 2 is a block diagram conceptually illustrating an example of a conventional acoustic wave touch input system 200. In FIG. 2 a transparent sensor layer 210 having a surface 209 covers a screen of a display system. The wave energy is directed along one or more paths that form an invisible grid overlaying the surface 209 wherein a touch to the surface 209 causes wave energy to be attenuated. Four transducers, two sending (201 and 204) and two receiving (202 and 203), are shown in FIG. 2. A transducer is a device that converts acoustic wave energy to electrical signal for measurement and information transfer purposes (i.e., enables pressure sensor). All four transducers 201, 202, 203 and 204 may be, for example, piezoelectric transducers and are located in the corners of the sensor layer 210. It should be noted that the choice of transducer type includes but is not limited to piezoelectric (as in the example above), electromagnetic, electrochemical, electromechanical, electroacoustic, photoelectric, electrostatic, thermoelectric, radioacoustic.

The touch sensor system 200 may be configured to respond to a touch on the touch-screen 210 by causing acoustic waves to be transmitted across the touch-screen 209, one or more of which are modulated in the presence of the touch. The controller 290 in turn may use the modulated signal from the waves to identify the location of the touch on the touch-screen 209. Basic operation of the touch sensor system 200 in FIG. 2 is as follows. The controller 290 may begin the scan process to continuously monitor the touch screen 210 for touch events. For example, the controller 290 may send a signal to the first sending transducer 201 via line 221. The sending transducer 201 may send acoustic waves in the horizontal direction. Acoustic waves may be partially reflected by reflector arrays 211 and 213, and then are received by the receiving transducer 203. The receiving transducer 203 may send a returning signal via line 223 to the controller 290. The controller 290 may then send a signal to the second sending transducer 204 via line 224. The sending transducer 204 may send acoustic waves in the vertical direction. Acoustic waves may be partially reflected by reflector arrays 214 and 212, and then may be received by the receiving transducer 202. The second receiving transducer 202 may send a second returning signal via line 222 to the controller 290. The returning signal may include timing and signal amplitude information representative of touch events, if present. Therefore, controller 290 may constantly send and receive signals in both the horizontal and vertical directions in order to detect the coordinates of one or more touch events. The time between the repetitive propagation of waves is the sampling rate or time. A measurement period may be determined as the time period to send and receive the first and second sets of signals.

The controller 290 may also use the modulated signal to distinguish between valid touches and invalid signals (e.g., signals generated by contamination on the surface of the screen). If the controller 290 identifies a touch as valid, it may transmit the touch's location to a host computer (not shown) which then may implement a corresponding computer function to display the pertinent information, e.g., graphics, on the display device 210. Graphics or other information such as new widows, menu, text files, etc. may be displayed on the display device 210 in response to an operator's command, e.g. touching a particular area of the touch-screen 209.

The controller 290 may send signals to the sending transducers 201 and 204 through communication channels 221 and 204 that may be implemented in one or two links schematically shown in FIG. 1 as part of link 140, respectively, and the transducers 201 and 224 may generate acoustic energy that may be sent across the sensor layer 210 and reflected by the reflector arrays. The controller 290 may accept signals from the receiving transducers 202 and 203 through communication channels 222 and 223 that may be implemented in one or two links schematically shown in FIG. 1 as part of link 140, respectively, and the received signals include timing and signal.

The controller 290 may include coded instructions (stored, for example, in a memory of a microprocessor), which when executed by a machine or processor, may perform steps to control and process the relevant (sent and received) signals. The controller 290 may not comprise a computer, but may be implemented in hardware, firmware, software or any combination thereof. The controller may include coded instructions to calculate the time the wave takes to travel from the sending transducers 201 and 204 to the receiving transducers 202 and 203 via the reflector arrays 211, 213, 214 and 212. The time taken is typically dependent on the path length, and therefore the position of an attenuation within the wave may be correlated to the time at which it was received relative to the time it was launched. Waves may be periodically and/or repetitively propagated in both the horizontal and vertical directions of the sensor layer 210 in order to allow the detection of coordinates of a touch event location 230.

When user of the system touches sensor layer 210 at any point of the surface, during a relative time of the touch event, touch location and pressure value are detected by the controller. In many systems, touch events with low touch pressure are generally ignored. The decision may be made by the controller and may generally depend on the minimum pressure threshold value stored in the controller as a fixed or configurable parameter. In some applications with touch sensitive screen interface, multiple detected touches may be interpreted as certain commands. For example, if the controller detects several touches with coordinates <$(X_1,Y_1)$, $(X_2,Y_2)$, . . . $(X_k,Y_k)$> forming a straight line, estimated touch pressure P at time T, and if time $T_1$ is less than time $T_k$ (threshold), then the system will interpret the touch sequence as a command to move visual content in the direction of a vector pointing from $(X_1,Y_1)$ to $(X_k,Y_k)$.

Figure 3:
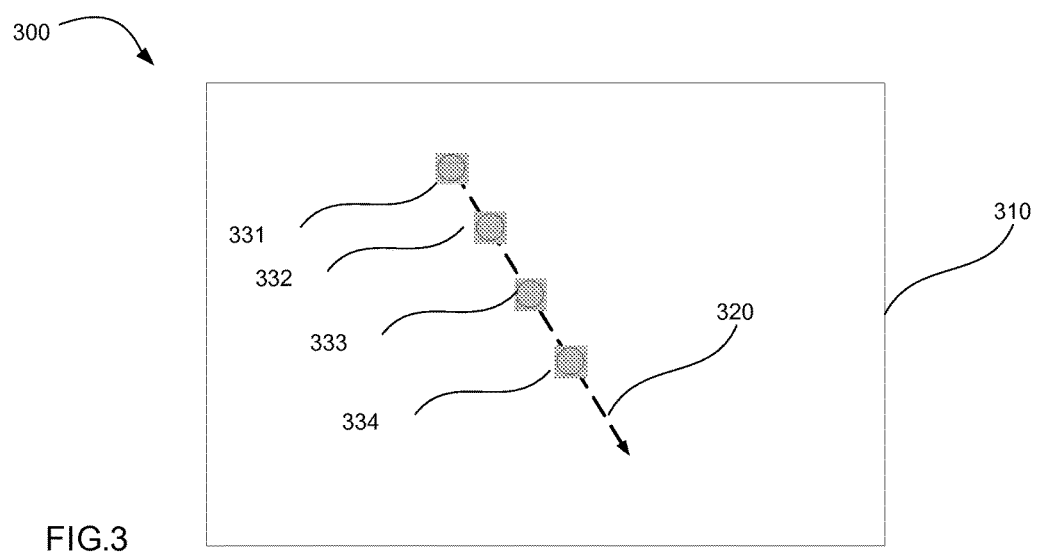
FIG. 3 illustrates consequent touch events caused by, for example, moving a finger on a touch sensitive surface.

For example, FIG. 3 illustrates consequent touch events caused by, for example, moving a finger on a touch sensitive surface. FIG. 3 illustrates four touch points $(X_1,Y_1,P_1,T_1)$ 331, $(X_2,Y_2,P_2,T_2)$ 332, $(X_3,Y_3,P_3,T_3)$ 333, $(X_4,Y_4,P_4,T_4)$ 334 detected by controller in relatively short time intervals. Interpretation of such touch command sequence is typically to move visual objects shown on the screen 310 in the direction of vector 320 pointing from location $(X_1,Y_1)$ to $(X_4,Y_4)$. A typical example of such application is a map of city streets or any other geographical application such as cell operator coverage area map, or the like. As mentioned in earlier paragraphs, often, in prior art systems, just as for a single touch command, each touch event of the sequence is considered valid only if the detected pressure exceeds certain threshold value.

Disadvantage of such conventional touch input systems is that a user may have to experiment with the touch pressures before his commands are properly recognized by the system. If the system is used primarily by one or a few users, this is not be perceived as a big disadvantage. However, when many people are using an application such as map viewer with touch input system, the experience could easily become frustrating for those users that do not apply a proper or sufficient pressure. Consider, for example, an application exhibiting wireless service operator coverage map in a cell phone store. Different customers can come in to the store, enter their desired address and view how coverage changes as they try to change location of the map around the specified address. Each customer typically has a unique touch and therefore system may easily disregard light touches that do not exceed certain pressure threshold.

Lowering threshold below certain value may not be desirable either. In that case the system could become very sensitive to any touch, and in the eyes of some customers "unpredictable" because any easy and often unintended touch would trigger a command thus resulting in unsatisfactory experience. It is clear, therefore, that a method and apparatus is needed for allowing touch input systems to avoid such undesired behavior. Present invention solves this problem as will become apparent from the description and drawings set force below.

Figure 4:
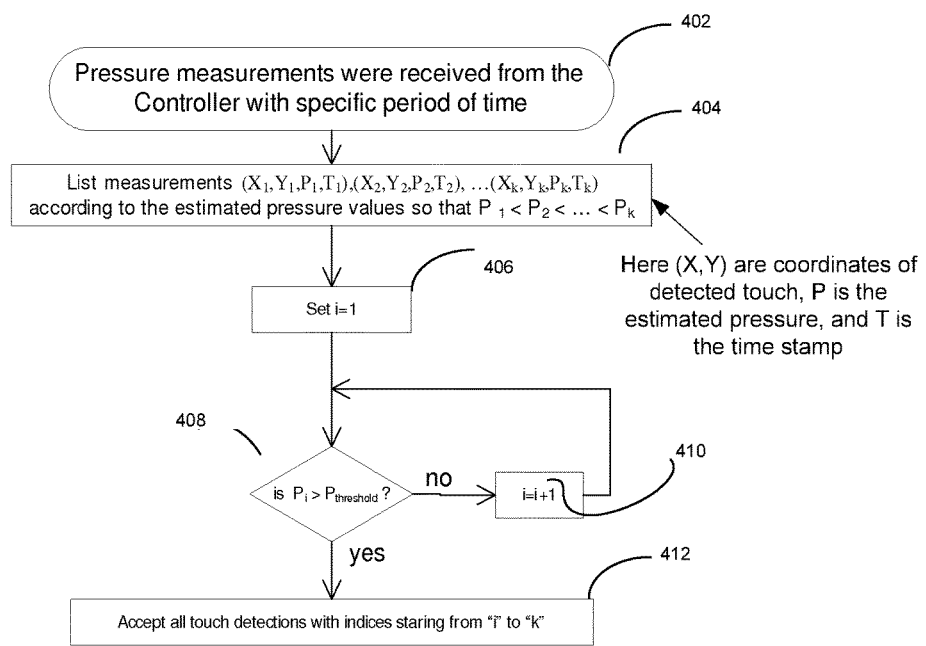
FIG. 4 illustrates example operations that may be performed by a controller for comparing touch pressure measurements to a pre-defined threshold.

FIG. 4 illustrates example operations 400 that may be performed by a controller for comparing touch pressure measurements to a pre-defined threshold. At 402, pressure measurements for a specific time period are received by the controller from the touch sensitive surface (or device). At 404, the received measurements are listed as $(X_1,Y_1,P_1,T_1)$, $(X_2,Y_2,P_2,T_2)$ . . . $(X_k,Y_k,P_k,T_k)$ according to the estimated pressure values so that $P1<P2< . . . <P_k$. At 406, a variable i is set to 1. At 408, if $P_1$ is not less than $P_{threshold}$, operations 400 branch out to 410 wherein the variable i is incremented by 1. At 408, if $P_1$ is less than $P_{threshold}$, operations 400 branch out to 412, where all touch detections with indices starting from "i" to "k" are accepted.

The idea of the invention is to store information captured by the controller. In the event when estimated touch pressure is below the threshold, the captured data may be stored in a temporary buffer located on the controller (see FIG. 5 below). If the next touch events occur in the same proximity as the previous ones, then the system may combine estimated touch pressure of newly received data with the stored data and compare with the pressure threshold value again. If the combined value exceeds the threshold value, touch event would be deemed as valid and the corresponding command may be sent to the application, and the stored data may be discarded. If not, the combined data may be stored again, and the process may be repeated up to a predetermined or specified number of times.

Figure 5:
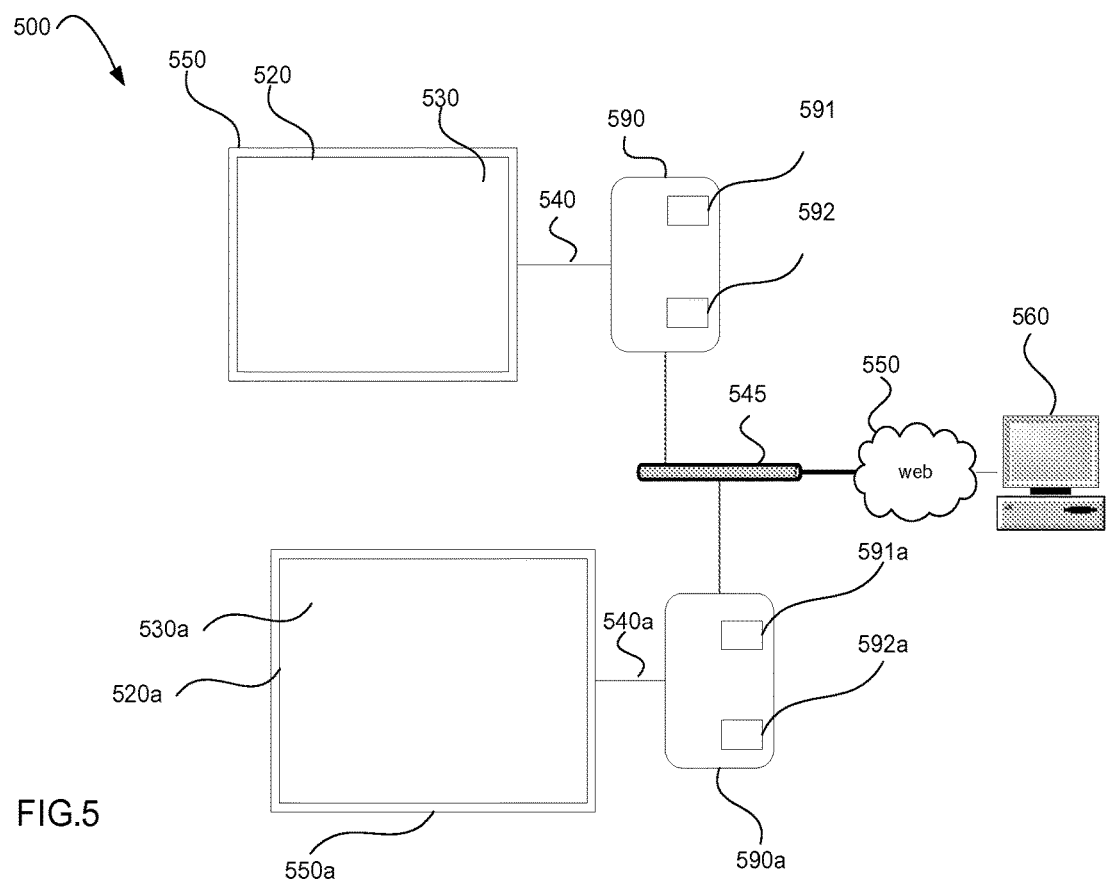
FIG. 5 is a block diagram conceptually illustrating an example of touch sensor system capable of combining ambiguous repetitive touch events in accordance with certain aspects of the present disclosure.

FIG. 5 is a block diagram conceptually illustrating an example of touch sensor system 500 capable of combining ambiguous repetitive touch events in accordance with certain aspects of the present disclosure. An "ambiguous" touch event may be defined as a touch event that may not be clearly identified as a touch command. An example in the context of this discussion would be a touch event with measured touch pressure being below a predefined threshold value.

The touch sensor system 500 generally comprises one or more touch-screen devices. A touch sensor system with multiple touch-screen devices is illustrated in FIG. 5 with two (identical by example only) touch-screen devices 550 and 550a. The touch-screen device 550, communicatively coupled to a controller 590 through link 540, comprises a transparent touch sensor layer 530 covered by a touch-screen 520 made out of transparent material such as glass. The controller 590 further comprises at least one buffer 591 and at least one microprocessor 592. In present invention the buffer 591 may temporarily store detected touch coordinate information, estimated touch pressure (pressure indicator), timestamp of touch event and/or other signals representative of detected touch events. The microprocessor 592 may combine signals of repetitive detected touches as discussed below, wherein at least one set of signals is stored in the buffer 591. It should be noted that the buffer 591 and the microprocessor 592 may be combined with the existing buffer(s) and microprocessor(s) of controllers used in prior art systems.

A touch-screen system comprising the touch-screen device 550 and controller 590 may be used in conjunction with a controller user interface unit 560 coupled with the controller 590 via direct link, internet web 550, wireless, or another connection. In an aspect, a touch sensor system may only have one touch-screen device. In an aspect, controller 590 and controller interface units may be built in to the touch-screen device 550. Separate units 550, 550a, 590, 590a, and 560 are shown purely for illustrative purposes.

The microprocessor 590 may output the combined information of detected touch events to another device such as a central or host computer 560 via lead 545. It should be understood that the coordinate information passed through the lead 545 is representative only. In addition, information may be output in many forms and formats by the computer 560, such as text or graphics on the display device 550, a different display device or monitor, a light, a bell, an initiation or termination of an action, and the like. Therefore, the information passed through the lead 545 may change based on the purpose of the touch sensor system 500. Optionally, the controller 590 may be located within a monitor or the display device 550, in a separate unit as illustrated, or within the computer 560.

Figure 6:
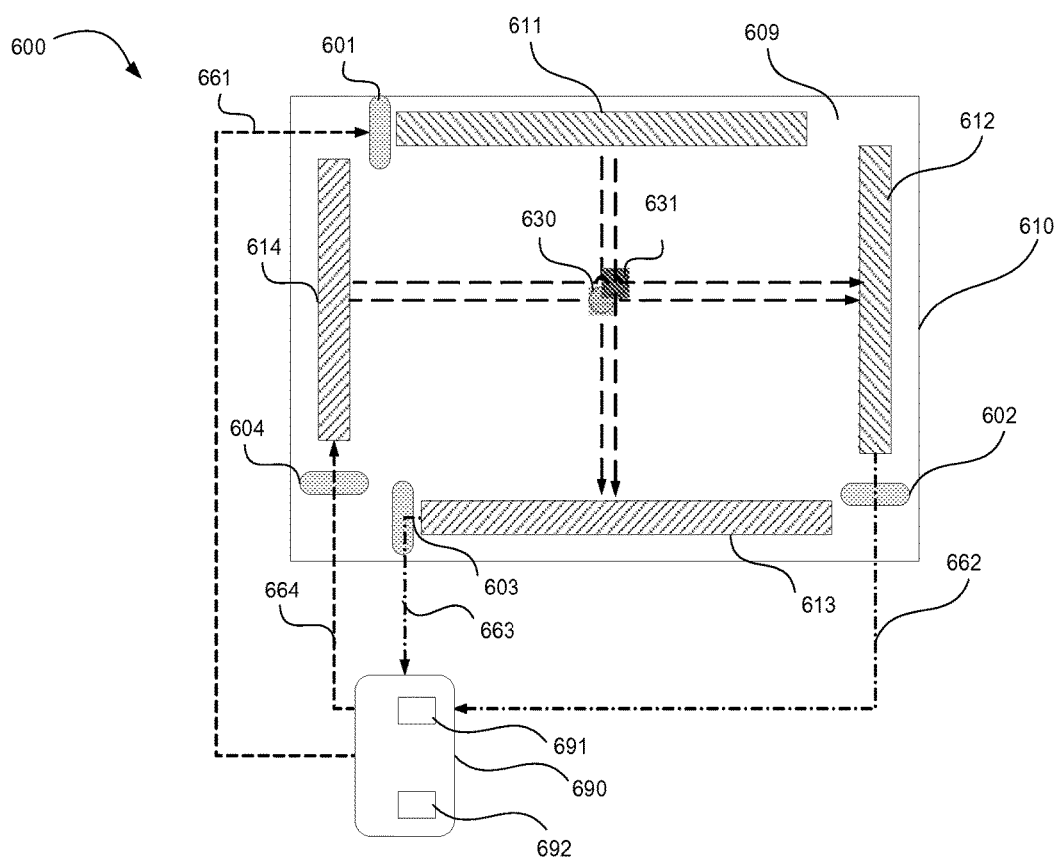
FIG. 6 is a block diagram conceptually illustrating an example of an acoustic wave touch input system in accordance with certain aspects of the present disclosure.

FIG. 6 is a block diagram conceptually illustrating an example of an acoustic wave touch input system 600 in accordance with certain aspects of the present disclosure. Although surface acoustic waves (SAW) are illustrated, it may be appreciated that other sensing technologies may also be used, including, but not limited to, acoustic wave, resistive, capacitive, projected capacitance, infrared, strain gauge, optical imaging, dispersive signal technology, and acoustic pulse recognition.

Method of sending and receiving signals by the controller 690 in system 600 is similar to that of the system 200 illustrated in FIG. 2 and described earlier. The main difference is in treatment of touch events with touch pressure below pre-defined threshold value. In this embodiment the method is implemented in the controller 690 and is described below. For the purpose of illustration in this embodiment in FIG. 6 a single touch command input is assumed to be repeated twice. In both cases, touch pressure measurement is below the pre-defined threshold value. First signals received by the controller 690 correspond to the touch event 630 and include at least coordinates $(X_0, Y_0)$, touch pressure $P_0$ and time $T_0$. Due to the touch pressure measurement being below the pre-defined threshold value $P_{threshold}$, $S_0=(X_0, Y_0, P_0, T_0)$ is stored in the buffer 691. Once the second touch event 631 signals are received by the controller 690 and $S_1=(X_1, Y_1, P_1, T_1)$ are available, $P_1$ is compared with the pre-defined threshold value $P_{threshold}$, and if P1 is less than $P_{threshold}$ then data $S_0$ and $S_1$ for both touch events are processed by the microprocessor 692 for possible combining into a signal touch event.

Figure 7:
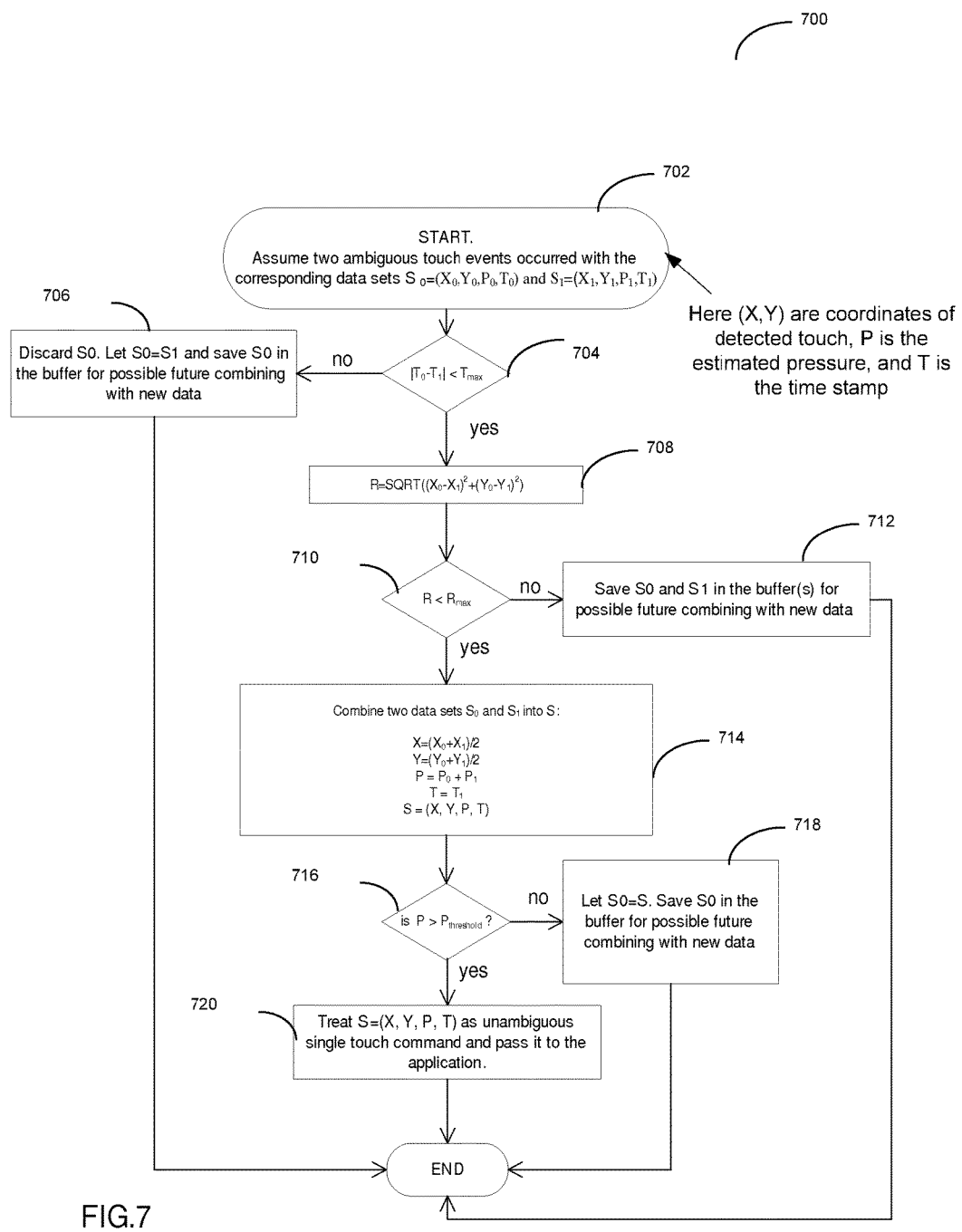
FIG. 7 illustrates example operations that may be performed by a controller for combining data for two ambiguous touch events in accordance with certain aspects of the present disclosure.

FIG. 7 illustrates example operations 700 that may be performed by a controller for combining data for two ambiguous touch events in accordance with certain aspects of the present disclosure. Operations 700 relate to an example of a method of combining data $S_0$ and $S_1$ of two ambiguous touch events. Operations 700 begin at 702 where the two ambiguous touch events $S_0$ and $S_1$ are received. Note that in this example both touch events may not be clearly identified as touch commands (detected touch pressure was below minimum allowed value). Instead of discarding the data, the operations 700 try to combine it in a way that would allow the system to detect multiple attempts of a user to execute a single touch command.

As is shown is FIG. 7, at 704, the system first checks if both detected touch events occurred within certain time interval. If the difference of timestamps of the two events exceed a pre-defined $T_{max}$ value, then two events are assumed not related, i.e. they do not represent repetitive attempts to execute a single touch command. Therefore, at 706, the system discards the earlier touch event data $S_0$, and saves the later touch event data in place of $S_0$ in the same buffer space.

At 704, If the timestamp difference is sufficiently small, then the system checks how close were touch events on the surface. In present embodiment closeness of touch locations is calculated at 708 as a simple Euclidian norm of points in two dimensional space: $R=SQRT((X_0-X_1)_2+(Y_0-Y_1)^2)$. If two locations are not sufficiently close, i.e. if R>Rmax for some pre-defined maximum distance Rmax, data sets can not be combined. In that case, at 712, the system stores both data sets in the buffer 691 for possible combining with future ambiguous touch event data. If, on the other hand R is sufficiently small, then data sets S0 and S1 are combined at 714 to form a single touch event signals S=(X, Y, P, T), where X and Y are mean values for (X,Y) coordinates of the two touch events, P is the sum of measured pressure values of the two touch events, and T is the timestamp of the newest touch event. For example, in FIG. 6 the two touch events 630 and 631 are shown by two overlapping circles illustrating that they are sufficiently close.

Once S is calculated by the processor 692, P is compared with the pre-defined threshold value at 716 to determine if the two combined data sets represent a repetitive attempt to execute a single touch command. If P is less than the pre-defined threshold, then, at 718, the newly combined data S is stored by the system in the buffer 691 for possible future combining with a new ambiguous touch event data. On the other hand, if P is greater than the threshold pressure, S is determined as valid/unambiguous single touch command at 720 and is passed to the application for further action.

It should be noted that operations 700 are not limited to combing only two touch event data sets. The above presented example of combining two touch event data can be easily extended to combining three and more touch events that occurred within specified time frame. Generalization of the above described method is immediate and should be understood by anyone skilled in the art.

Figure 8:
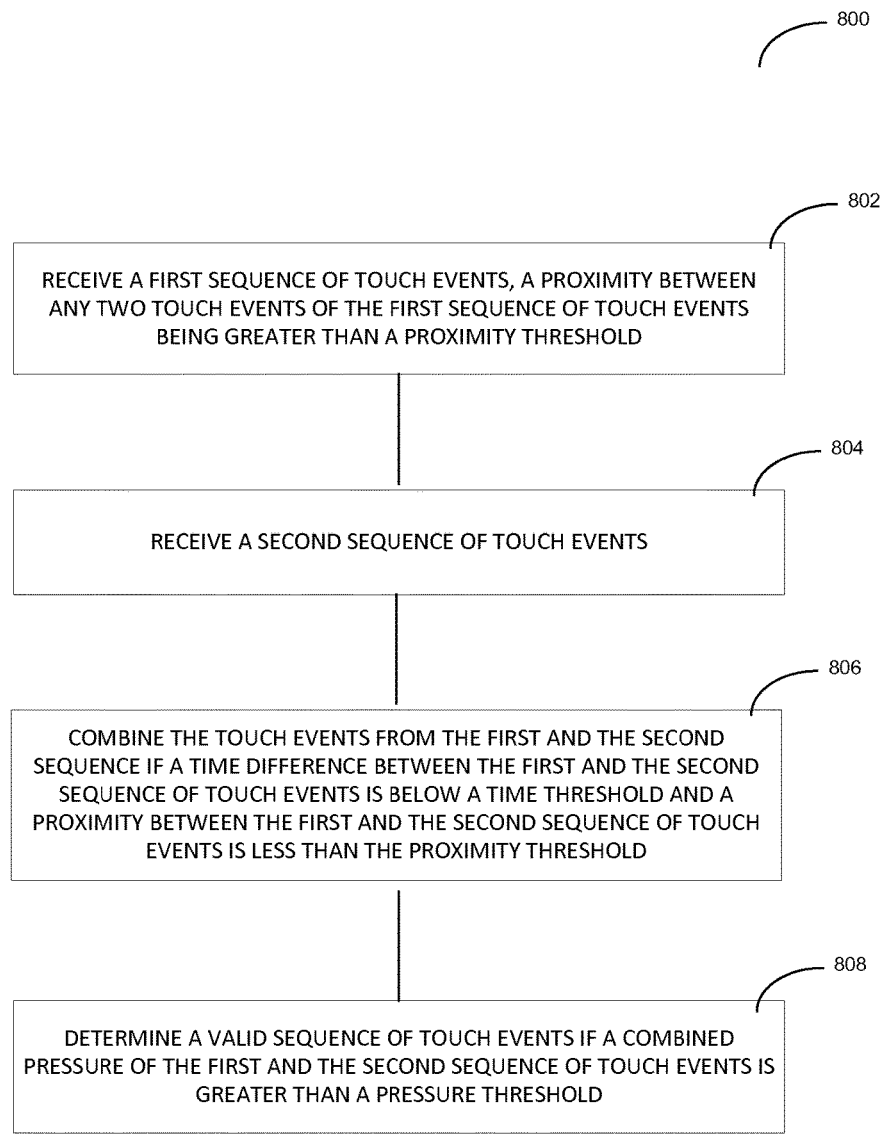
FIG. 8 illustrates example operations that may be performed by a controller for combining data for two sequences of touch events in accordance with certain aspects of the present disclosure.

FIG. 8 illustrates example operations that may be performed by a controller for combining data for two sequences of touch events in accordance with certain aspects of the present disclosure. At 802, a first sequence of touch events is received, a proximity between any two touch events of the first sequence of touch events being greater than a proximity threshold. At 804, a second sequence of touch events is received. At 806, the touch events from the first and the second sequence are combined if a time difference between the first and the second sequence of touch events is below a time threshold and a proximity between the first and the second sequence of touch events is less than the proximity threshold. At 808, a valid sequence of touch events is determined if a combined pressure of the first and the second sequence of touch events is greater than a pressure threshold.

In certain aspects, the time difference between the first and the second sequence of touch events includes a time difference between a last received touch event in the first sequence and a first received touch event in the second sequence.

In certain aspects, the proximity between the first and the second sequence of touch events includes proximities between corresponding touch events in the first and the second sequence of touch events.

In certain aspects, the combined pressure of the first and the second sequence of touch events comprises a sum of pressures of corresponding touch events in the first and the second sequence of touch events.

In certain aspects, the first sequence of touch events is stored in a buffer.

In certain aspects, each touch event in the first and the second sequence of touch events comprises a position indicator, a pressure indicator and a time stamp.

In certain aspects, the pressure indicator of a defined number of touch events in the first and the second sequence of touch events is below a threshold.

Figure 9:
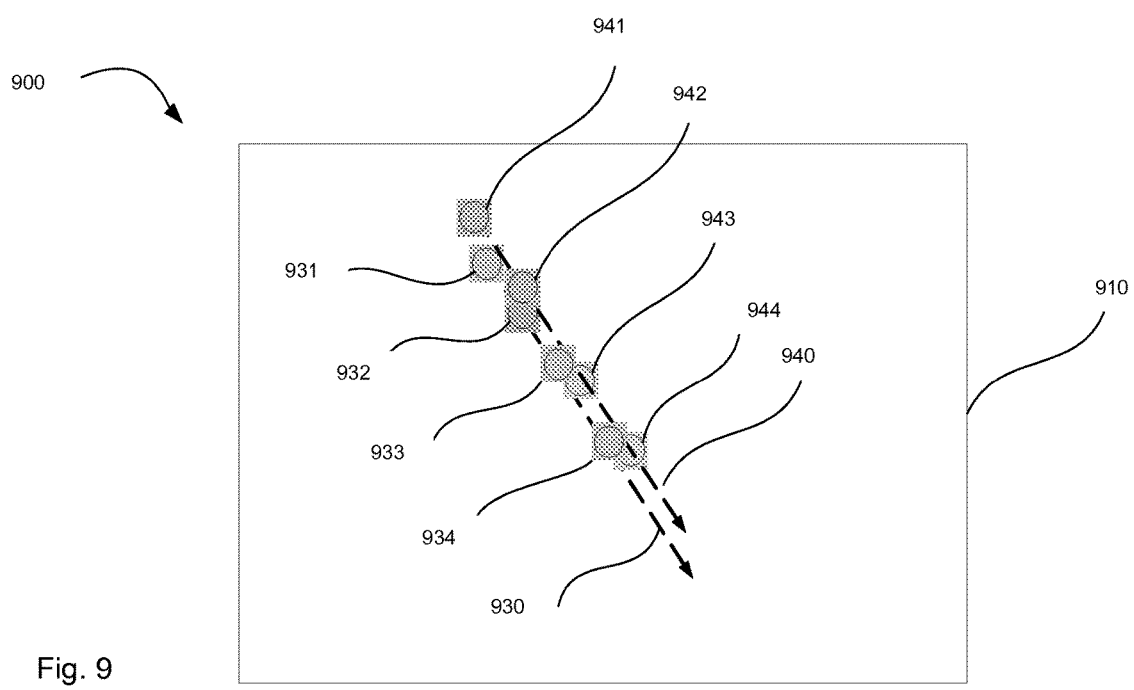
FIG. 9 illustrates an extension of the method of combining data for two touch events to combining data two sequences of touch events in accordance with certain aspects of the present disclosure.

FIG. 9 illustrates an extension of the method of combining data for two touch events to combining data two sequences of touch events in accordance with certain aspects of the present disclosure. FIG. 9 illustrates a method for combining data for repetitive touch events corresponding to user moving his finger on the surface of a touch sensitive device such as a touch screen. The system detects a first sequence of touch events 931, 932, 933, 934 along the vector 930. Assuming that the pressure of a defined number of touch events in the first sequence is less than a pressure threshold these touch events may be deemed ambiguous. Assuming that the proximity of the (X,Y) coordinates of these touch events is greater than a threshold proximity, the touch events may not be combined, and assuming that the touch events form a straight line, the system stores all four data sets $S_k=(X_k, Y_k, P_k, T_k)$ with k=931, 932, 933, 934 in the buffer for possible combining with future data. In an aspect, the pressure of a defined number of touch events in the first sequence of touch events is below a pressure threshold.

A similar second sequence of touch events 941, 942, 943, 944 is received and the system analyses the second sequence. Assuming that the a predefined number of touch events in the second sequence are below the pressure threshold, the system concludes that the second sequence is also ambiguous and the touch events in the second sequence may not be combined due to the location/proximity of (X,Y) coordinates of detected touch events as with the first sequence discussed above. Assuming that these touch events/data points also form a straight line, the system may try to combine these data sets $S_r=(X_r, Y_r, P_r, T_r)$ with r=941, 942, 943, 944 with the stored data sets. In an aspect, if $T_{934}$ (the last detected touch of the first series) is sufficiently close to $T_{941}$ (the first detected touch of the second series), then the system will try to combine set $S_k$ and $S_r$.

Combining set of data Sr and Sk is done as described above for single touch command and for the purpose of illustrating of this embodiment it is assumed that only three valid combining combinations are possible. These possibilities are illustrated as overlapping circles corresponding to touch events 932 and 942, 933 and 943, 934 and 944 shown in FIG. 9. Anyone will appreciate that extension of this example to combining more than two such sets is immediate.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
    receiving a first sequence of touch events;
    receiving a second sequence of touch events; and
    determining a valid sequence of touch events when a combined pressure of the first and the second sequence of touch events is greater than a pressure threshold, wherein the combined pressure of the first and the second sequence of touch events comprises a sum of pressures of corresponding touch events in the first and the second sequence of touch events.

2. The method of claim 1, further comprising combining the touch events from the first and the second sequence when a proximity between the first and the second sequence of touch events is less than a proximity between any two touch events of the first sequence of touch events.

3. The method of claim 2, wherein the proximity between the first and the second sequence of touch events comprises proximities between corresponding touch events in the first and the second sequence of touch events.

4. The method of claim 1, further comprising combining the touch events from the first and the second sequence when a time difference between the first and the second sequence of touch events is below a time threshold, wherein the time difference between the first and the second sequence of touch events comprises a time difference between a last received touch event in the first sequence and a first received touch event in the second sequence.

5. The method of claim 1, further comprising storing the first sequence of touch events in a buffer.

6. The method of claim 1, wherein each touch event in the first and the second sequence of touch events comprises a position indicator, a pressure indicator and a time stamp.

7. The method of claim 6, wherein the pressure indicator of a defined number of touch events in the first and the second sequence of touch events is below a threshold.

8. An apparatus, comprising:
    at least one processor; and
    a memory coupled to the at least one processor;
    wherein the at least one processor is configured to:
        receive a first sequence of touch events,
        receive a second sequence of touch events, and
        determine a valid sequence of touch events when a combined pressure of the first and the second sequence of touch events is greater than a pressure threshold wherein the combined pressure of the first and the second sequence of touch events comprises a sum of pressures of corresponding touch events in the first and the second sequence of touch events.

9. The apparatus of claim 8, wherein the at least one processor is further configured to combine the touch events from the first and the second sequence when a proximity between the first and the second sequence of touch events is less than a proximity between any two touch events of the first sequence of touch events.

10. The apparatus of claim 8, wherein the proximity between the first and the second sequence of touch events comprises proximities between corresponding touch events in the first and the second sequence of touch events.

11. The apparatus of claim 8, wherein the at least one processor is further configured to combine the touch events from the first and the second sequence when a time difference between the first and the second sequence of touch events is below a time threshold, wherein the time difference between the first and the second sequence of touch events comprises a time difference between a last received touch event in the first sequence and a first received touch event in the second sequence.

12. The apparatus of claim 8, wherein the at least one processor is further configured to store the first sequence of touch events in a buffer.

13. The apparatus of claim 8, wherein each touch event in the first and the second sequence of touch events comprises a position indicator, a pressure indicator and a time stamp.

14. The apparatus of claim 13, wherein the pressure indicator of a defined number of touch events in the first and the second sequence of touch events is below a threshold.

15. A computer program embodied on a non-transitory computer-readable medium, the computer program configured to cause at least one processor to:
    receive a first sequence of touch events,
    receive a second sequence of touch events, and
    determine a valid sequence of touch events when a combined pressure of the first and the second sequence of touch events is greater than a pressure threshold, wherein the combined pressure of the first and the second sequence of touch events comprises a sum of pressures of corresponding touch events in the first and the second sequence of touch events.

16. The computer program of claim 15, the computer program further configured to cause the at least one processor to combine the touch events from the first and the second sequence when a proximity between the first and the second sequence of touch events is less than a proximity between any two touch events of the first sequence of touch events.

17. The computer program of claim 15, wherein the proximity between the first and the second sequence of touch events comprises proximities between corresponding touch events in the first and the second sequence of touch events.

18. The computer program of claim 15, the computer program further configured to cause the at least one processor to combine the touch events from the first and the second sequence when a time difference between the first and the second sequence of touch events is below a time threshold, wherein the time difference between the first and the second sequence of touch events comprises a time difference between a last received touch event in the first sequence and a first received touch event in the second sequence.

19. The computer program of claim 15, the computer program further configured to cause the at least one processor to store the first sequence of touch events in a buffer.

20. The computer program of claim 15, wherein each touch event in the first and the second sequence of touch events comprises a position indicator, a pressure indicator and a time stamp, wherein the pressure indicator of a defined number of touch events in the first and the second sequence of touch events is below a threshold.

* * * * *